Patented July 8, 1952

2,602,802

UNITED STATES PATENT OFFICE 2,602,802

PURIFICATION OF BETA-PROPIOLACTONE

Thomas L. Gresham and Jacob Eden Jansen, Akron, Ohio, assignors to The B. F. Goodrich Company, New York, N. Y., a corporation of New York No Drawing. Application March 22, 1950, Serial No. 151,313

6 Claims. (Cl. 260—344)

This invention relates to the purification of beta-propiolactone, and pertains more particularly to the removal of acetic anhydride from crude beta-propiolactone.

It is disclosed in U. S. Patent 2,356,459 to Frederick E. Küng that beta-lactones, that is, lactones or inner esters of beta-hydroxy carboxylic acids, may be obtained in good yields by the reaction of a ketene with an aldehyde or ketone. In this manner beta-propiolactone (hydracrylic acid lactone) which has the structure

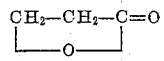

is economically obtained from ketene and formaldehyde according to the following equation:

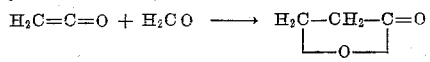

In the preparation of beta-propiolactone by this method, some acetic anhydride (generally about 5 to 15% of the reaction product) is formed by the reaction of water, ordinarily present with the formaldehyde, with two molecular proportions of ketene as follows:

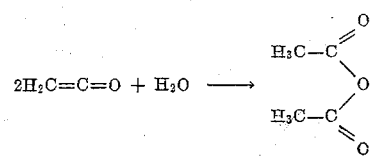

The acetic anhydride present as a contaminant in crude beta-propiolactone is quite difficult to remove by distillation at atmospheric or reduced pressures due to the fact that there is but very little difference in the boiling points of the two compounds.

Accordingly, it is an object of the present invention to provide an efficient method for removing acetic anhydride from crude beta-propiolactone and for obtaining beta-propiolactone of high purity. Other objects will be apparent hereinafter.

We have now discovered that the above and other objects are accomplished by treating the crude beta-propiolactone with a liquid primary or secondary monohydric alcohol. By this method the acetic anhydride is converted to acetic acid and an ester of acetic acid with the alcohol. The ester and acetic acid are then easily separated from the beta-propiolactone by a simple distillation. In this manner very pure beta-propiolactone is obtained.

It is quite surprising that alcohols will selectively react with the acetic anhydride rather than with the beta-propiolactone, since beta-propiolactone is known to react readily with alcohols in the presence of acidic materials to give beta-alkoxy propionic acids. It is also known that beta-propiolactone reacts with acid anhydrides such as acetic anhydride to form beta-acyloxy propionic acids and the corresponding anhydride. However, when crude beta-propiolactone containing acetic anhydride is treated with alcohols in accordance with this invention the quantity of beta-propiolactone, if any, that reacts with either the alcohol or the acetic anhydride is so small as to be for all practical purposes negligible.

The alcohol which is utilized to effect removal of the acetic anhydride from crude beta-propiolactone may be any liquid monohydric alcohol in which the hydroxyl group is attached to a carbon atom also attached to at least one hydrogen atom. Included within this class of alcohols are liquid primary and secondary, saturated and unsaturated, aliphatic, alicyclic and aromatic alcohols which may be substituted or unsubstituted. Specific alcohols which may be utilized are primary alcohols such as methanol, ethanol, n-propanol, n-butanol, n-pentanol, n-hexanol, 2-chloro-1-ethanol, 2-cyano-ethanol, benzyl alcohol phenylethyl alcohol, cyclohexanol, allyl alcohol, methallyl alcohol, cinnamyl alcohol, chloro-allyl alcohol, 2-carboxy-1-ethanol and the like; and liquid secondary alcohols such as 2-butanol, 2-propanol, 2-pentanol, 3-pentanol, 2-methyl-3-butanol, 2-methyl-4-hexanol, 2-decanol, 2-chloro-4-hexanol, 1 - bromo-3 - pentanol, 3 - cyano-2-pentanol, 5-carboxy-1-pentanol, 3-buten-2-ol, 2,4-hexadien-1-ol, 1-bromo - 3,4 - dichloro-3-buten-2-ol, 1-carboxy-3-buten-2-ol, alpha-methyl benzyl alcohol and the like.

Especially preferred alcohols are the liquid saturated aliphatic primary and secondary monohydric alcohols especially those which contain from 1 to 5 carbon atoms, and accordingly the preferred embodiments of this invention include the treatment of crude beta-propiolacetone with alcohols of these types such as methanol, ethanol, n-propanol, n-butanol, n-pentanol and 2-propanol.

The purification process is readily carried out simply by first admixing the alcohol with the crude beta-propiolactone containing acetic anhydride, preferably in an amount such as to provide a 50 to 100% molar excess of the alcohol, based on the amount of acetic anhydride present, thereby forming a single phase system (since the beta-lactone, acetic anhydride and alcohol are all mutually soluble in one another). Although the reaction of the alcohol with the acetic anhydride will proceed at room temperatures and at even lower temperatures, the mixture is preferably heated to a temperature in the range of about 50° C. to 150° C. for a time sufficient for the reaction to occur, which ordinarily requires about 1 to 4 hours. The resulting mixture is then distilled, preferably at reduced pressure, to give the pure-beta-propiolactone, as well as other fractions consisting of acetic acid, the alcohol and the ester formed by reaction of the alcohol with acetic anhydride.

The following examples are intended to illustrate the practice of this invention but are not to be construed as a limitation upon the scope thereof, for there are, of course, numerous possible variations and modifications. In the examples all parts are by weight.

*Example I*

To a crude mixture comprising 873 parts of beta-propiolactone and 127 parts of acetic anhydride (1.25 moles) there are added 150 parts (2 moles) of n-butanol. The reactants are then heated at 90° C. for about 2 hours. The resulting mixture is vacuum distilled at 20 mm. and 863.3 parts of 100% beta-propiolactone (B. P. 61° C./20 mm., $N_D^{25}=1.4110$, $D_4^{20}=1.1460$) are obtained. 240.7 parts of a mixture of butyl acetate, acetic acid and butanol are also obtained in the first fractions.

*Example II*

Example I is repeated except that 63 parts (2 moles) of methanol are substituted for the n-butanol. Upon distillation of the reaction mixture at about 20 mm. 103 parts of a mixture of acetic acid, methyl acetate and methanol are obtained as a first fraction and approximately 800 parts of 100% beta-propiolactone $(d_4^{25}=1.1420, B. P. 61° C./20 mm.)$ are recovered in succeeding fractions.

*Example III*

Example I is repeated using a 100% excess of 2-propanol instead of the n-butanol. An amount of pure beta-propiolactone equivalent to that obtained in Example I is recovered.

Moreover, when the above examples are repeated utilizing other of the primary and secondary alcohols disclosed hereinabove, for example, pentanol, allyl alcohol, 1-hydroxy-2-chloroethane, 1-hydroxy-2-cyanoethane, benzyl alcohol, 1-bromo-3-pentanol, and 3-pentanol, the results obtained are in general equivalent to those of the examples.

Although specific examples are included herein, it is not intended to limit the invention thereto, for numerous modifications will be apparent to those skilled in the art, and are within the scope of the appended claims.

We claim:

1. The method of separating acetic anhydride from beta-propiolactone which comprises admixing beta-propiolactone containing acetic anhydride with a monohydric alcohol in which the hydroxyl group is attached to a carbon atom also attached to at least one hydrogen atom, maintaining said beta-lactone and said alcohol in admixture for about 1 to 4 hours during which period said alcohol reacts with said acetic anhydride to form acetic acid and an ester of acetic acid with said alcohol, and fractionating the resulting mixture to recover pure beta-propiolactone.

2. The method of separating acetic anhydride from beta-propiolactone which comprises admixing beta-propiolactone containing acetic anhydride with a saturated aliphatic monohydric alcohol in which the hydroxyl group is attached to a carbon atom also attached to at least one hydrogen atom, heating the resulting mixture at a temperature of from 50° C. to 150° C. for about 1 to 4 hours during which period said alcohol reacts with said acetic anhydride, and fractionating the reaction mixture to recover pure beta-propiolactone.

3. The method of separating acetic anhydride from beta-propiolactone which comprises admixing beta-propiolactone containing acetic anhydride with a saturated aliphatic primary monohydric alcohol heating the resulting mixture at a temperature of from 50° C. to 150° C. for about 1 to 4 hours during which period said alcohol reacts with said acetic anhydride, and fractionating the reaction mixture to recover pure beta-propiolactone.

4. The method of claim 3 wherein the saturated aliphatic primary monohydric alcohol utilized is methanol.

5. The method of separating acetic anhydride from beta-propiolactone which comprises admixing beta-propiolactone containing acetic anhydride with a saturated aliphatic secondary monohydric alcohol, heating the resulting mixture at a temperature of from 50° C. to 150° C. for about 1 to 4 hours during which period said alcohol reacts with said acetic anhydride, and fractionating the reaction mixture to recover pure beta-propiolactone.

6. The method of claim 5 wherein the saturated aliphatic secondary monohydric alcohol utilized is 2-propanol.

THOMAS L. GRESHAM.
JACOB EDEN JANSEN.

REFERENCES CITED

The following references are of record in the file of this patent:

UNITED STATES PATENTS

| Number | Name | Date |
|---|---|---|
| 2,007,968 | Graves | July 16, 1935 |
| 2,450,132 | Hagemeyer | Sept. 28, 1948 |